United States Patent [19]
Gray

[11] 3,913,726
[45] Oct. 21, 1975

[54] ARTICLE CARRY TRAY FOR CARRIAGES OF A COMMODITY SORTING SYSTEM

[75] Inventor: Wallie P. Gray, Chula Vista, Calif.
[73] Assignee: Rohr Plessey Corporation, Rockville, Md.
[22] Filed: May 2, 1974
[21] Appl. No.: 466,222

[52] U.S. Cl. .................... 198/154; 104/25; 104/88; 198/155; 199/DIG. 7; 220/72; 224/48 R
[51] Int. Cl.² ......................................... B65G 17/00
[58] Field of Search ....... 198/155, 158, 38, 42, 195, 198/DIG. 7, 154; 104/25, 18, 20, 88; 220/66, 72; 224/48 R

[56] References Cited
UNITED STATES PATENTS

| | | | |
|---|---|---|---|
| 777,375 | 12/1904 | James | 198/195 X |
| 3,167,192 | 1/1965 | Harrison et al. | 198/155 X |
| 3,510,014 | 5/1970 | Speaker et al. | 198/155 X |
| 3,521,808 | 7/1970 | Weiss | 220/72 X |
| 3,568,879 | 3/1971 | Box | 220/72 X |

Primary Examiner—Evon C. Blunk
Assistant Examiner—Douglas D. Watts
Attorney, Agent, or Firm—Patrick J. Schlesinger; Charles C. Logan, II

[57] ABSTRACT

An article carrying tray to be attached to the top of a carriage assembly. The tray is an integrally formed injection molded foam plastic tray having a generally rectangular article carrying top surface. The top surface of the tray is substantially smooth and the bottom surface of the tray has a downwardly protruding grid-like structure that provides reinforcing strength for the article carrying top surface. Upstanding lips are formed along the peripheral edges of two of the opposite sides of said top surface, with one of said lips extending upwardly higher than the other. The tray is made of polycarbonate plastic and the top surface thereof has a coefficient of friction greater than 0.35. A plurality of inserts are ultrasonically installed in the bottom surface of the tray after it has been molded for receiving the fastening means used to attach the article carrying tray to the top of the carriage assembly. The top surface of the tray comprises two substantially identical portions that extend upwardly and outwardly from the center line of the tray in the form of a wide profile V.

4 Claims, 7 Drawing Figures

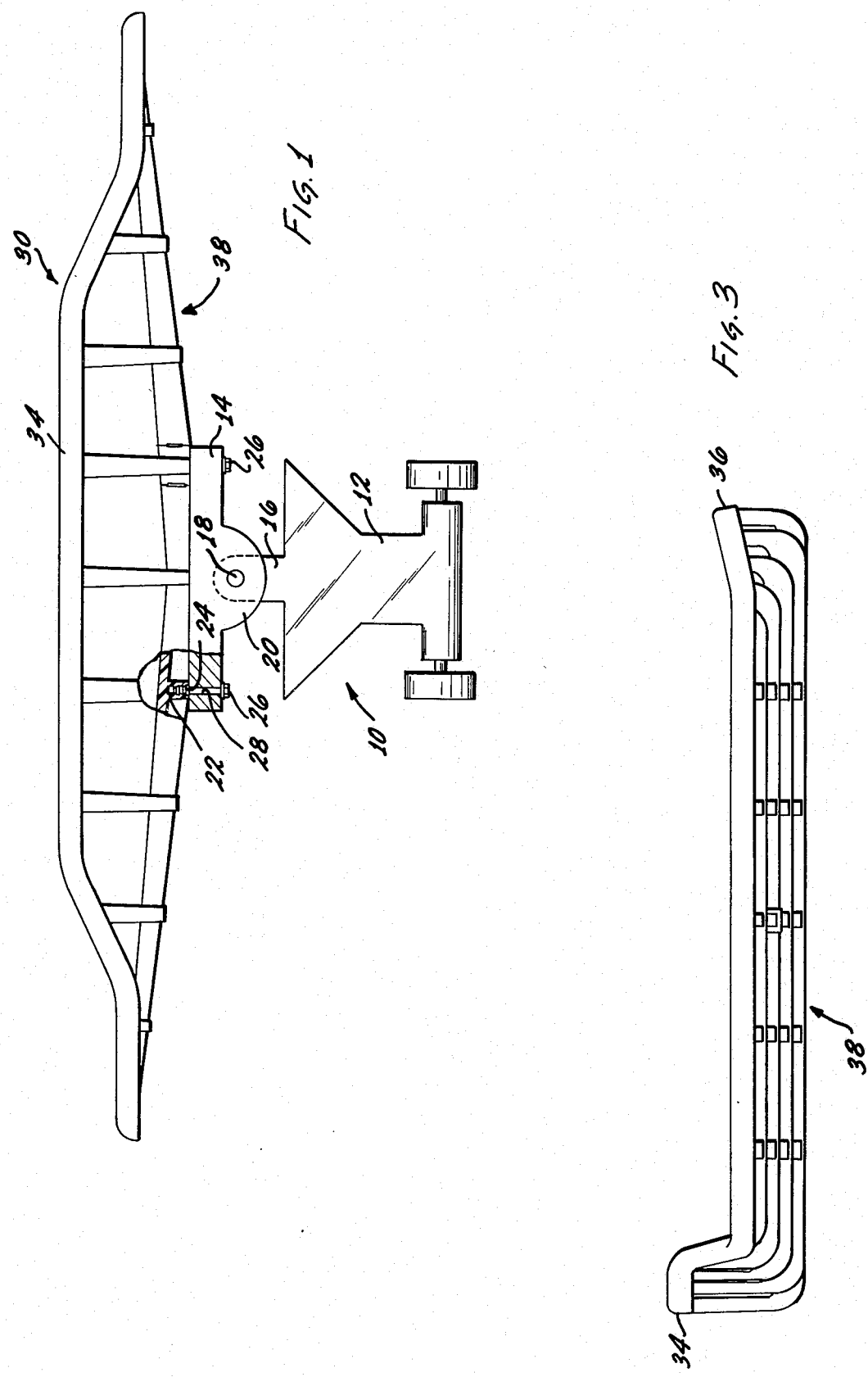

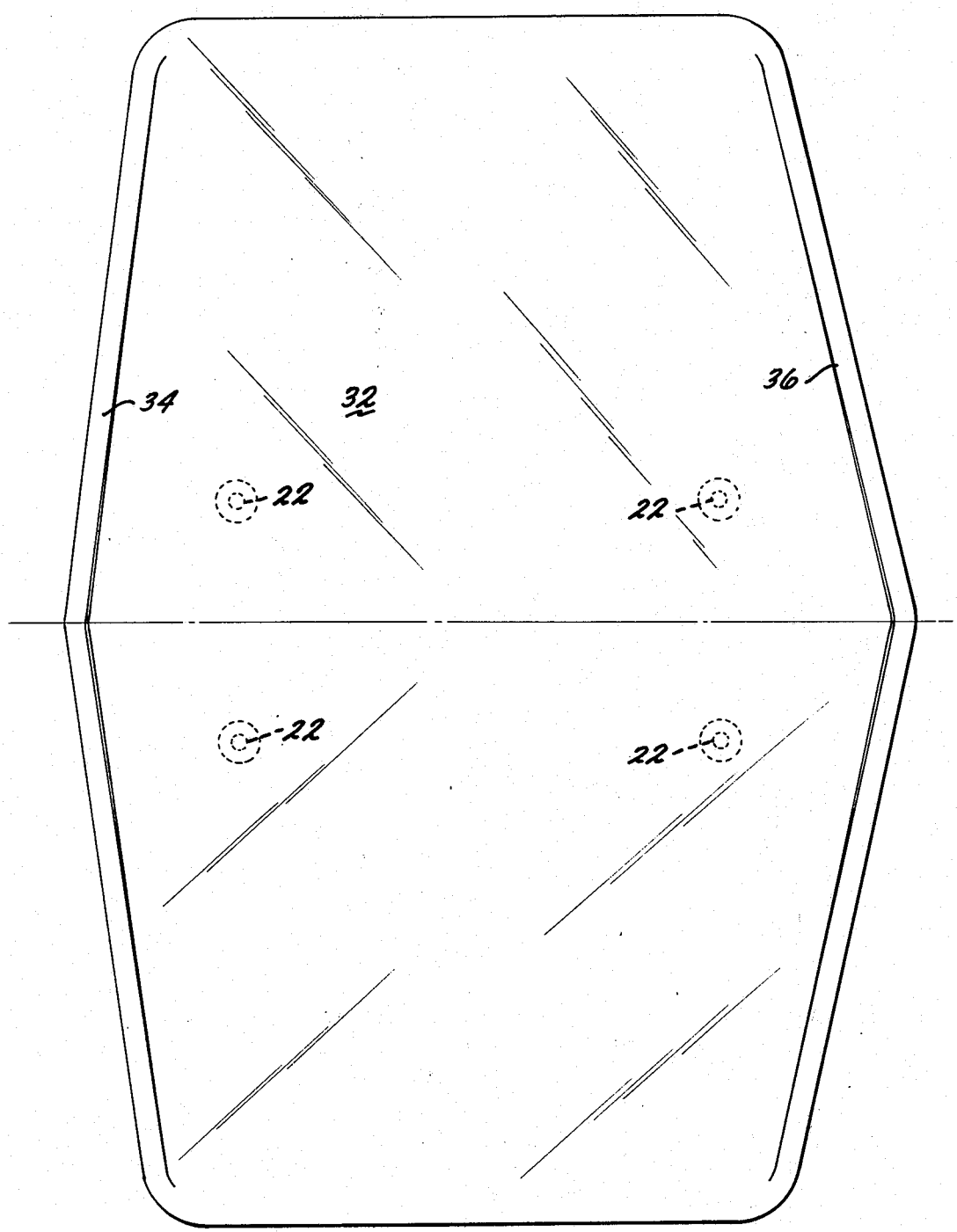

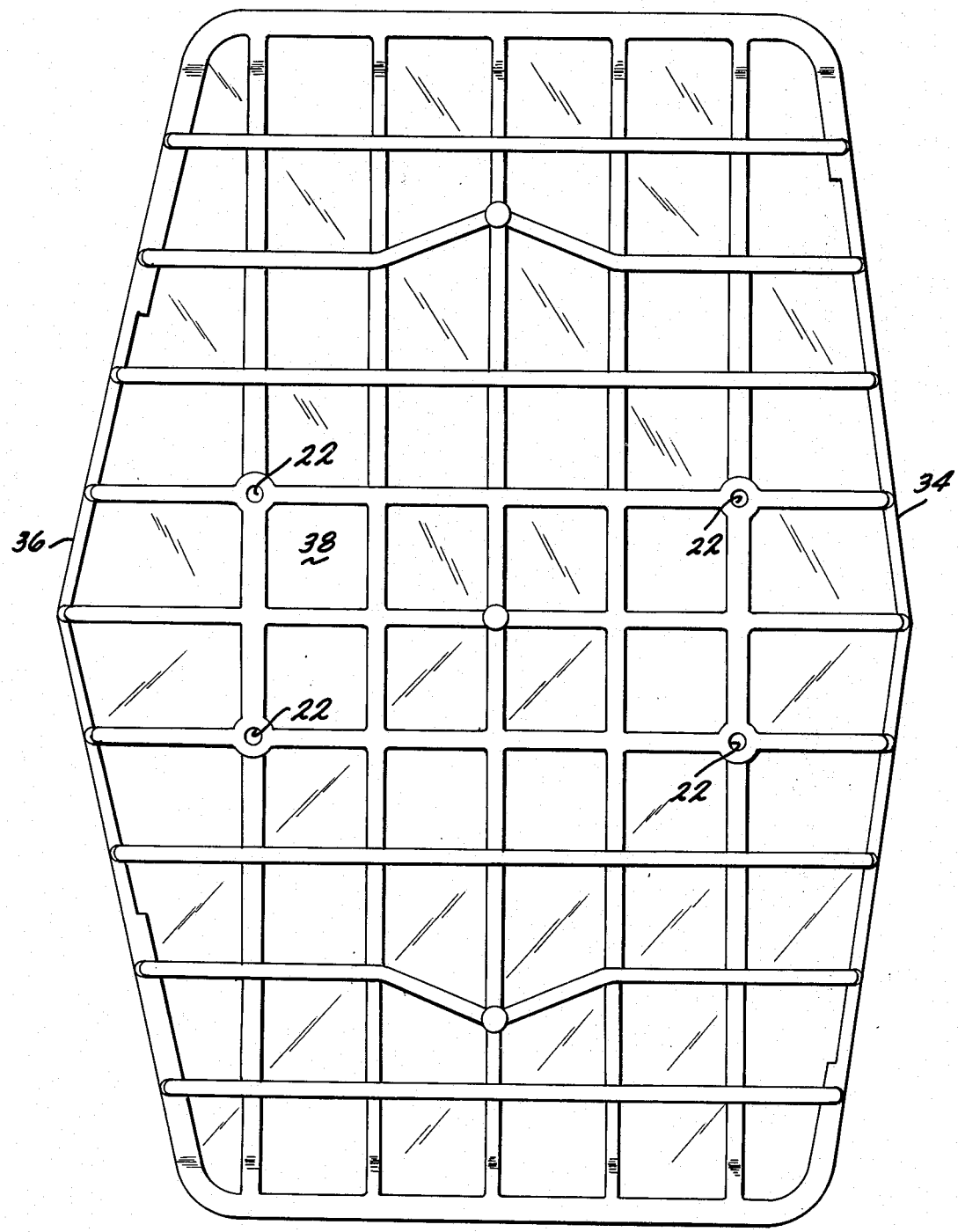

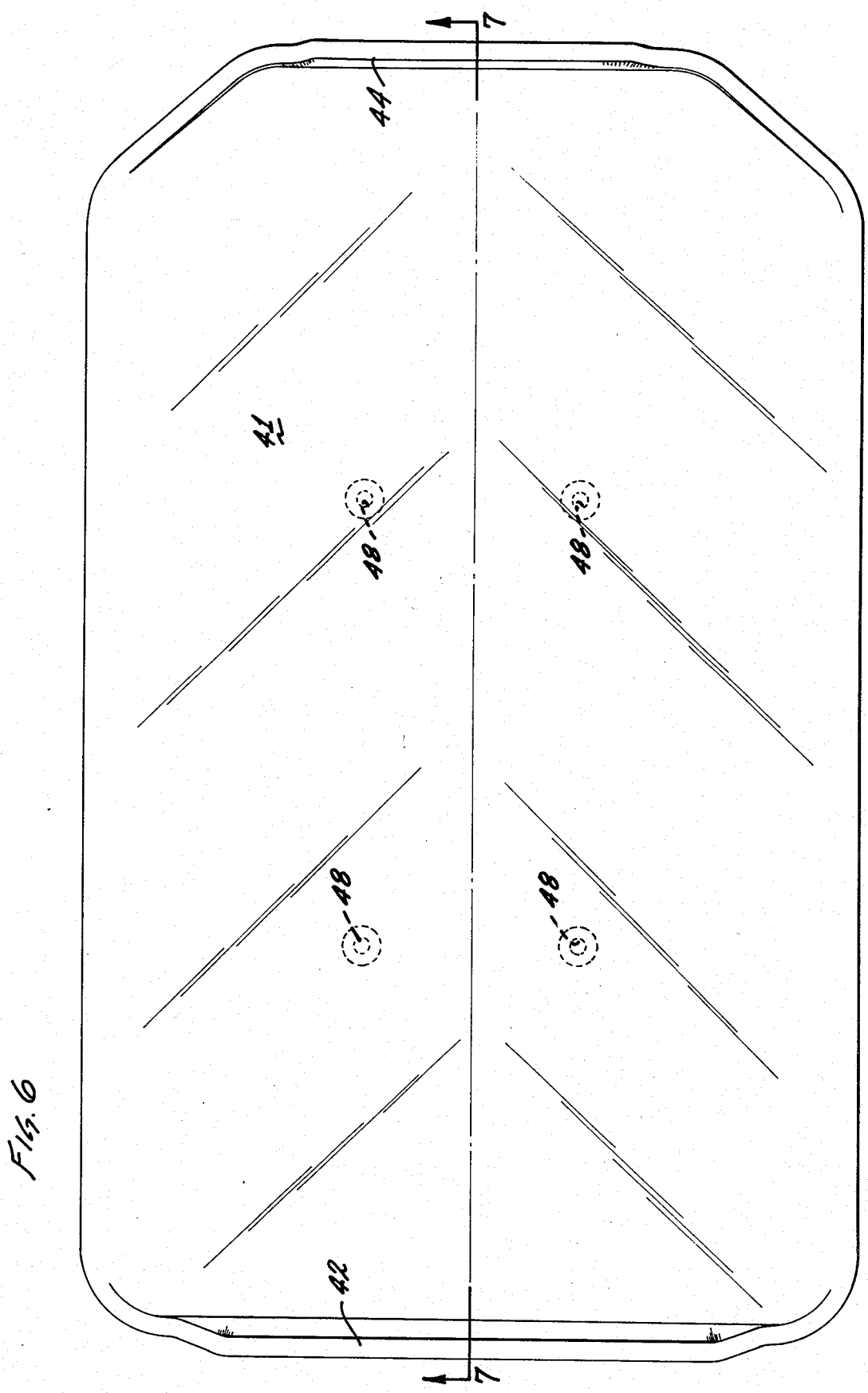

3,913,726

ARTICLE CARRY TRAY FOR CARRIAGES OF A COMMODITY SORTING SYSTEM

BACKGROUND OF THE INVENTION

The invention relates to an article carrying tray and more specifically to a parcel or sack tray that is mounted on a conveyor carriage. These trays normally have the capability for pivotal movement between a load carrying position and a load discharging position. The carriages are usually part of an automatic conveying and sorting system used for transporting parcels or sacks from one or more loading stations to a plurality of pre-selected receiving or discharging stations.

In the past, sack trays were made from steel 0.1 inches thick and weighed approximately 40 pounds. The edges of the sack trays were rolled for stiffness and the bottom of the trays had two retainers to hold and position nuts for attachment of the tray to the carriage. The parcel trays were made from fiberglass reinforced plastic. The edge of the parcel trays included a steel bar for strength and the center of the tray bottom included a steel plate with lugs that was molded into the tray for strength and attachment purposes. The weight of the parcel trays was approximately 27 pounds. Manufacturing time for these trays was lengthy and expensive when considering the simplicity of the job they were to perform. Additionally the trays were necessarily heavier than normal so that they would have sufficient strength to withstand the impact of heavy sacks and parcels that would be deposited upon the trays.

Another problem of the prior art trays existed due to the nature of the conveyor sorting and discharge systems. These systems normally utilized induction conveyors that rapidly slide the sack or parcel onto the trays at a relatively rapid speed. As a result, many of the parcels and sacks would receive impacting damage when they contacted the back stop positioned behind the trays at the loading station. The coefficient of friction of the top surface of the prior art trays was not enough to sufficiently decelerate the speed of the parcel or sack as it was slid forward onto the tray.

SUMMARY OF THE INVENTION

The sack and parcel trays of this invention are integrally formed injection molded foam plastic trays having a generally rectangular article carrying top surface. The trays are made of a polycarbonate plastic. The top surface of the trays are substantially smooth with upstanding lips formed along the peripheral edges of two of the opposite sides of said top surface, one of said lips extending upwardly higher than the other. These upstanding lips prevent the parcels and sacks from sliding off the front or rear of the tray while they are being carried along a conveyor track. The bottom surface of the trays have a downwardly protruding grid-like structure that provides reinforcing strength for the article carrying top surface. The top surface of the trays also comprise two substantially identical portions that extend upwardly and outwardly from the center line of the tray in the form of a wide profile V. This provides a cradle into which the sack or parcel may settle during its travel to prevent the sacks and parcels from being accidentally shaken off of the lateral sides of the trays while they are traveling on the conveyor track. The top surface of the trays have a coefficient of friction greater than 0.35 to provide proper deceleration of the sacks and parcels as they are slid onto the trays at the loading station. With this increased coefficient of friction, the parcels do not slide across the trays and impact a back stop and thereby reduce potential parcel damage during the induction loading process.

The manufacturing time for the sack and parcel trays has been greatly reduced along with the cost of manufacturing said trays. By utilizing the polycarbonate plastic material in the tray, the weight of the sack tray was reduced from 40 pounds to 15 pounds and the parcel tray was reduced from 27 pounds to 13 pounds. An added benefit of molding the trays resulted from the fact that no finishing and no painting of the trays is required. Four inserts for attaching the trays to the top of a conveyor carriage are citrasonically installed in the bottom surface of the trays after they have been molded.

It is an object of the invention to provide an article carrying tray that can be manufactured inexpensively and quickly.

It is another object of the invention to provide an article carrying tray that is appreciably lighter than previous trays utilized in prior conveying and sorting systems and yet ones that were sufficiently strong to withstand the impact of sacks or parcels dumped onto the trays.

It is another object of the invention to provide an article carrying tray having a top surface whose coefficient of friction is sufficiently high enough to properly decelerate sacks and parcels that are slid onto the trays and thereby prevent impacting damage to these articles.

It is a further object of the invention to provide an article carrying tray for attachment to the top assembly that can be molded in one integral member.

BRIEF DESCRIPTION OF THE DRAWINGS

FIG. 1 is a front elevation view of the parcel tray illustrating the manner in which it is mounted on a carriage assembly, FIG. 2 is a plan view of the parcel tray, FIG. 3 is an end elevation view of the parcel tray, FIG. 4 is a bottom view of the parcel tray, FIG. 6 is a plan view of the sack tray.

DESCRIPTION OF THE PREFERRED EMBODIMENTS

Figure 5:
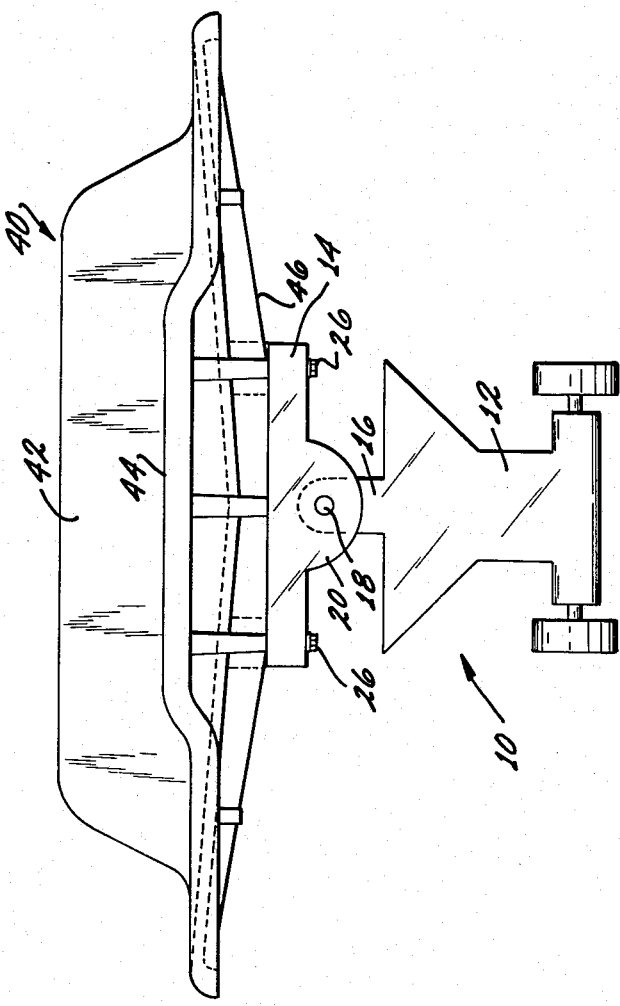
FIG. 5 is a front elevation of the sack tray illustrating the manner in which it is mounted on a carriage assembly.

Referring to FIG. 1, a parcel tray 30 is illustrated attached to the top of a carriage which is generally designated numeral 10. The carriage comprises a truck 12 and a support plate 14. Arms 16 extend upwardly from the front and rear (not shown) of the truck and have axially aligned bore holes that respectively receive front trunnion 18 and a rear trunnion not seen. Lips 20 extend downwardly from the support plate 14 at both the front and rear of the plate. These lips have bore holes that align with the bore holes of the upwardly extending truck arms and receive the respective trunnions. The parcel tray is thus pivotally mounted atop the carriage 10 whereby it may receive a parcel on its top surface and after the carriage travels to a specific destination, the parcel tray may be tilted in the desired direction to discharge the parcel at a specific unloading station.

A portion of the support plate and lower surface of the parcel tray is broken away to illustrate the manner of attaching the tray to the carriage. The bottom of the tray has molded cavities 22 into which metal inserts 24 have been ultrasonically installed. The inserts are internally threaded to receive bolts 26 that pass through bore holes 28 in the support plate. The parcel tray 30 is thus attached to the support plate 14 at four locations in a quick and easy assembly operation.

The parcel tray 30 itself will be described by referring to FIGS. 2–4. The tray is integrally formed from a foamed plastic material by an injection molding process. The plastic material used is a high impact engineering plastic of polycarbonate. It is self extinguishing and will not support a flame when fire is removed. The foam molding produces a top surface 32 that has a coefficient of friction of 0.37. This coefficient of friction is higher than that of steel or fiberglass top surfaces of the previously manufactured parcel trays and sack trays. Upstanding lips 34 and 36 are formed along the peripheral edges of two of the opposite sides of the top surface. Forward lip 34 extends upwardly higher than the aft lip 36 and these lips combine to prevent a parcel from falling off the forward or rear ends of the tray while the carriage is traveling along the conveyor route. Bottom surface 38 of the tray has a downwardly protruding grid-like structure that provides reinforcing strength for the article carrying top surface 32. Cavities 22 are integrally molded into this bottom surface. The top surface of the tray is substantially smooth and it is comprised of two substantially identical portions that extend upwardly and outwardly from the center line of the tray in the form of a wide profile V.

Figure 7:
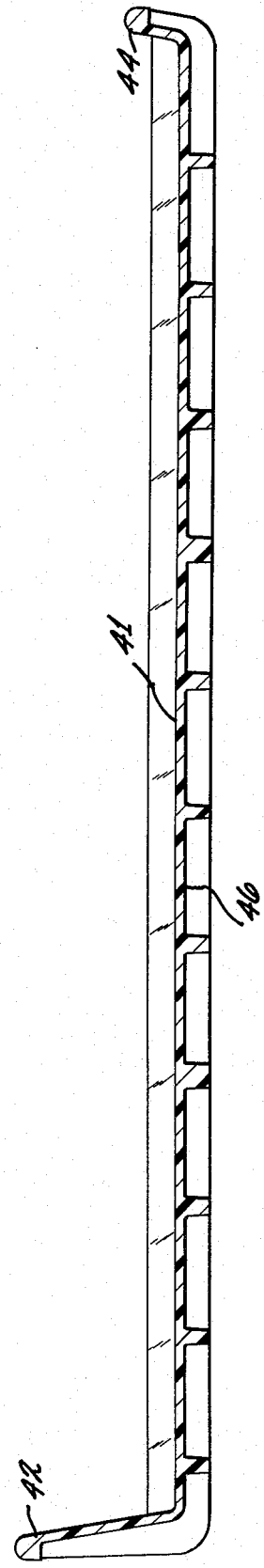
FIG. 7 is a cross section taken through lines 7—7 of FIG. 6.

The sack tray is generally designated by numeral 40 and will be described by referring to FIGS. 5–7. The carriage 10 is attached to the bottom of the sack tray in a manner similar to that used for attaching the carriage to the parcel tray as was previously described. The sack tray is also integrally formed from the same material used for forming the parcel tray. The top surface 41 of the sack tray is substantially smooth and has a coefficient of friction of 0.37. Upstanding lips 42 and 44 are formed along the peripheral edges of two of the opposite sides of said top surface, with lip 42 extending upwardly higher than lip 44. The bottom surface 46 of the sack tray has a downwardly protruding grid-like structure that provides reinforcing strength for the article carrying top surface and it has a plurality of cavities 48 for receiving metal inserts. The top surface of the sack tray comprises two substantially identical portions that extend upwardly and outwardly from the center line of the tray in the form of a wide profile V.

Having thus described the invention, what is claimed as new and useful and desired to be secured by U.S. Letters Patent is:

1. An article carrying tray comprising:
   an integrally formed injection molded polycarbonate foam plastic tray having a generally rectangular article carrying top surface,
   said top surface of said tray being substantially smooth and having a coefficient of friction greater than 0.35,
   upstanding lips formed along the peripheral edges of two of the opposite sides of said top surface, one of said lips extending upwardly higher than the other,
   the bottom surface of said tray having a downwardly protruding grid-like structure that provides reinforcing strength for the article carrying top surface,
   said tray having a plurality of ultrasonically installed inserts in its bottom surface for receiving fastening means used to attach said article carrying tray to the top of a carriage assembly.

2. An article carrying tray as recited in claim 1 wherein said upwardly extending lips are formed along the two longer sides of said generally rectangular article carrying top surface.

3. An article carrying tray as recited in claim 1 wherein said upwardly extending lips are formed along the two shorter sides of said generally rectangular article carrying top surface.

4. An article carrying tray as recited in claim 1 wherein the top surface of said tray comprises two substantially identical portions that extend upwardly and outwardly from the center line of said tray in the form of a wide profile V.

* * * * *